(12) United States Patent  
Schedler et al.

(10) Patent No.: US 7,708,963 B2  
(45) Date of Patent: May 4, 2010

(54) METHOD AND APPARATUS FOR TREATING WASTE GAS FLOWS LADEN WITH AEROSOL AND DUST

(76) Inventors: Johannes Schedler, Am Schlossberg 6, A-8410 Wildon (AT); Heimo Thalhammer, Josef-Posch-Strasse 123, A-8010 Graz (AT); Alexander Deutsch, Frohsinnstrasse 12, A-8200 Gleisdorf (AT)

( * ) Notice: Subject to any disclaimer, the term of this patent is extended or adjusted under 35 U.S.C. 154(b) by 1338 days.

(21) Appl. No.: 11/124,431

(22) Filed: May 6, 2005

(65) Prior Publication Data

US 2005/0249644 A1 Nov. 10, 2005

(30) Foreign Application Priority Data

May 7, 2004 (DE) .................. 10 2004 022 737

(51) Int. Cl.
- *B01D 53/34* (2006.01)
- *B01D 53/38* (2006.01)
- *F23G 7/06* (2006.01)

(52) U.S. Cl. .................. 423/210; 422/175; 431/5; 165/4; 165/909

(58) Field of Classification Search .................. 423/210; 422/175; 431/5; 165/4, 909
See application file for complete search history.

(56) References Cited

U.S. PATENT DOCUMENTS

| 4,474,118 A | 10/1984 | Benedick |
| 5,259,757 A | 11/1993 | Plejdrup et al. |
| 5,635,142 A * | 6/1997 | Ichiki et al. .................. 422/177 |
| 5,658,541 A * | 8/1997 | Matros et al. ................ 423/210 |
| 5,839,894 A | 11/1998 | Schedler et al. |
| 5,891,411 A * | 4/1999 | Gribbon .................. 423/245.3 |
| 6,203,316 B1 * | 3/2001 | Pennington .................. 432/180 |

FOREIGN PATENT DOCUMENTS

| DE | 3428537 A1 | 2/1985 |
| EP | 0472605 B1 | 12/1993 |

* cited by examiner

*Primary Examiner*—Timothy C Vanoy  
(74) *Attorney, Agent, or Firm*—Flynn, Thiel, Boutell & Tanis, P.C.

(57) ABSTRACT

For treating waste gas flows, a regenerative thermal afterburning system is used, comprising at least four regenerators, filled with ceramic heat accumulator bodies, and connected via a common combustion chamber. The waste gas is alternately admitted in cycles to one regenerator, whose heat accumulation bodies have been preheated, and then burned in the combustion chamber to yield clean gas, the said gas being extracted by a further regenerator, with simultaneous heating of the latter's heat accumulator bodies, while a third regenerator is flushed with flush gas. During the cyclical operation of the three regenerators, the remaining fourth regenerator extracts combustion chamber air from the combustion chamber, for the removal of deposits on the heat accumulator bodies in this regenerator by means of pyrolysis. In turn, a fan then feeds this extracted air to the crude gas.

14 Claims, 2 Drawing Sheets a)

b)

c)

d)

a)

b)

c)

d)

e)

f)

METHOD AND APPARATUS FOR TREATING WASTE GAS FLOWS LADEN WITH AEROSOL AND DUST

The invention relates to a process for treating waste gas flows according to the generic description in claim 1, an apparatus to carry out the process, and its use for treating waste gas flows extremely heavily laden with aerosols and/or dusts.

Methods and apparatuses of this kind for treating waste gases are well known. For example, DE 34 28 537 A1 discloses a thermal afterburning system featuring three regenerators with bulk material in pellets as heat accumulator bodies. EP 0 472 605 B1 discloses a similar apparatus with prism-shaped heat accumulator bodies with a plurality of ducts running parallel to the principal axis of the prism. The straight ducts produce a steady flow, but these heat accumulator bodies, too, are subject to considerable contamination after longer operating periods if the waste gas is laden with organic aerosol and carbon-containing dust. The contamination obstructs the passage of the waste gas through the heat accumulator bodies, thus reducing the capacity and purification rate of the system, and increasing operating costs.

In order to eliminate the contamination in the regenerators, according to U.S. Pat. No. 5,259,757 air that has been heated with a burner to approx. 500° C. is introduced to the regenerator to be treated. The disadvantage here is the high energy requirement of the burner to compensate for the temperature difference in relation to the combustion chamber.

In U.S. Pat. No. 5,839,894, combustion chamber air is extracted from the combustion chamber in order to remove deposits on the heat accumulator bodies by means of pyrolysis. With this method, however, the system is capable of only a limited purification rate during the pyrolysis process, since it features only two regenerators that, each time the system is switched over, release the dead volume of the regenerator—into which the waste gas has been previously admitted—untreated into the atmosphere.

The well-known regenerative waste gas treatment systems have proved particularly unsuitable for waste gas flows containing high-boiling aerosols and dusts, since these hinder a high efficiency of such systems owing to adsorption and deposits. Waste gas flows of this kind, with high-boiling aerosols and dusts, occur in the processing of bituminous materials, e.g. the electrodes for fused salt electrolysis in the manufacture of aluminum are created by heating a coal-bitumen mixture. Because the waste air of such systems for processing bituminous materials also contains polyaromatic hydrocarbons (PAHs) as high-boiling organic components, particularly high standards need to be set for the purification rate of such waste air in regenerative thermal afterburning systems.

The object of the invention is to maintain the high efficiency and high purification rate of regenerative thermal afterburning systems even when treating waste gas flows that are extremely heavily laden with aerosols and/or dusts.

According to the invention, the preferred approach is initially to separate off the coarser particles and aerosol components in a preliminary purification system with at least two fixed-bed filter devices operated in parallel. The fixed-bed filter devices, of which there are at least two, are alternately switched between separation and regeneration mode. The envisaged location for the preliminary purification system is in the crude gas line, through which the gas to be treated flows, upstream of the thermal regenerative afterburning system. The fixed-bed filter that is in separation mode is operated at the same temperature as the waste gas to be treated, e.g. at between 50 and 200° C.

The fixed-bed filters consist of ceramic bulk material, e.g. saddle bodies with grain sizes of between 0.5 and 4" (1.27-10.16 cm), ideally between 1 and 2" (2.54-5.08 cm). The height of the fixed-bed filter or the thickness of its filter layer should preferably be between 0.3 and 1 m, ideally around 0.6 m.

The tower packing in the fixed-bed filter has no organized structure, and creates heavy turbulence in the waste gas as the gas passes through. The turbulent flow deposits and separates out a large proportion of the coarser dust and liquid aerosol particles contained in the waste gas onto the tower packing of the fixed-bed filter. The separated solid matter remains in the clearance volume of the collection material, while some of the separated liquid seeps down and collects on the floor of the fixed-bed filter device, or adheres to the tower packing as a liquid film.

In contrast, gas contaminants in the waste gas pass unobstructed through the preliminary purification system and are then destroyed in the regenerative thermal afterburning system located downstream. The fixed-bed filters are designed in such a way as to maximize uptake of solid matter and liquids while keeping the associated drop in pressure to a minimum.

According to the invention, a burner or similar heating device is preferably envisaged to generate hot air from fresh air. This hot air can be used to regenerate the fixed-bed filter device that is operating in regeneration mode.

The hot air has the effect of burning, pyrolizing, or expelling the deposits in the fixed-bed filter. Preferably, the resulting waste gases are initially fed into the regenerators via the crude gas line, once the temperature of the fixed-bed filter to be regenerated by the hot gas has been heated to a set temperature, and thereafter to the combustion chamber of the regenerative thermal afterburning system. If all the waste gases created in the regeneration of the fixed-bed filter are fed into the crude gas line, this can result in considerable contamination of the heat accumulator bodies in the regenerators. Additionally, the waste gases that are fed into the crude gas line from the fixed-bed filter in regeneration mode, at lower temperatures, are more volatile.

In contrast, admitting all the waste gases formed in the regeneration of the fixed-bed filter, including those emitted from the fixed-bed filter at the set temperature, would affect the energy balance of the afterburning system, because additional fuel would then have to be supplied to the burner in the afterburning system.

The preferred method, therefore, is initially to feed the waste gases formed during the regeneration of the fixed-bed filter to the crude gas line, until the fixed-bed filter has reached a temperature of at least 200° C., preferably around 300° C., and thereafter to the combustion chamber of the regenerative thermal afterburning system, whereby the temperature of the waste gases fed into the combustion chamber should preferably be between 200 and 450° C., ideally between 300 and 400° C. The temperatures of the waste gases from the fixed-bed filter in regeneration mode are measured by a temperature sensor. The temperature in the combustion chamber of the regenerative thermal afterburning system should preferably be between 750 and 1000° C., ideally between 800 and 900° C.

Downstream of the preliminary purification system, the waste gas in the crude gas line is preheated using the hot air that has been heated by the burner by between 20 and 100° C., preferably by between 30 and 50° C. This reduces the tendency of the aerosols that the preliminary purification system cannot retain to be deposited on the heat accumulator bodies in the regenerators.

The effect of preheating with hot air is that even the smallest droplets of liquid in the flow of gas are kept in the flow where most of them evaporate, and are thus prevented from combining into larger droplets that would be deposited in the lower section of the regenerators. It is essential to prevent as much liquid as possible from being deposited in the lower section of the regenerators, because there is no continuous structural separation between the compartments for the crude gas and the clean gas sections in regenerative thermal afterburning systems. Under certain circumstances, liquid precipitated from the crude gas could in turn be evaporated and desorbed in the next treatment cycle at a slightly higher clean gas temperature, and then escape into the atmosphere. This adsorption/desorption effect particularly affects the treatment of waste gases containing high-boiling organic compounds, especially polyaromatic hydrocarbons, whose levels in clean gas must generally be kept to below 0.5 mg/Nm$^3$, whereas the level of organic carbons in clean gas must generally be kept to below (10-20 mg/Nm$^3$.

The pre-treated and preheated waste gas then passes into the regenerative thermal afterburning system. Owing to the upstream preliminary purification and preheating, there is a greatly reduced level of deposition of solid and liquid matter on the heat accumulator bodies in the regenerators. Here, it should be stressed that, because of the regenerative process, the heat accumulator bodies in the alternately operated regenerators must be kept as free as possible from deposits to ensure that no contaminants are transmitted into the clean gas in cyclical mode.

To this end, the preferred solution is to use prism-shaped heat accumulator bodies, with the principal prism axes arranged in the same direction as the gas flow. The interior of each prism features a plurality of continuous ducts ending on both end surfaces of the prism, essentially arranged parallel to the principal axis of the prism, and essentially running in straight lines. Each regenerator should preferably have at least two layers, arranged one on top of the other, consisting of heat accumulator bodies with their lateral prism surfaces adjacent to one another.

It has proved beneficial to have a non-porous surface at least on the heat accumulator bodies in the bottom layer. The non-porous surface can be a glazed surface.

The specific surface area of these heat accumulator bodies should be at least 500 m$^2$/m$^3$. The ducts should have a cross-sectional area, through which gas can pass, of preferably 3-25 mm$^2$. The width of the bars between the ducts should preferably be between 0.5 and 1 mm. The prism length of the heat accumulator bodies is maximally 1 m. Heat accumulator bodies such as these are manufactured by extruding ceramic masses, and are described in more detail in EP 0 472 605 B2.

From the outset, the more or less steady flow throughout the heat accumulator bodies greatly reduces the tendency of particles and droplets to accumulate. The heat accumulator bodies should preferably have a non-porous surface; this applies particularly to the lower layers. With regenerators featuring four heat accumulator layers, for example, the two lower layers can have a glazed, non-porous surface. The glazing can be applied by dipping the heat accumulator bodies in a suitable saline solution. A thick, non-porous oxide of alumina or alternatively porcelain ceramic is also used to make non-porous heat accumulator bodies. The non-porous surface further reduces contamination of the heat accumulator bodies.

The steady flow of the preheated crude gas in the heat accumulator bodies also allows the passage of most solid and aerosol particles into the combustion chamber of the regenerative thermal afterburning system, where they are completely destroyed by oxidation.

In order to ensure that there is no particle deposition on the fan impeller, the main fan of the apparatus disclosed in the invention used to convey the waste gas should preferably be located downstream of the regenerative thermal afterburning system. The regenerative thermal afterburning system is therefore operated at low (negative) pressure.

According to the invention, the regenerative thermal afterburning system features at least four regenerators filled with heat accumulator bodies, with a common combustion chamber.

In one cycle, the crude gas is fed to a regenerator whose heat accumulator bodies have previously been heated. The crude gas heats up and is burned in the combustion chamber in order to yield clean gas. The clean gas is then extracted by a second regenerator, with simultaneous heating of the latter's heat accumulator bodies. Meanwhile, a third regenerator is flushed with flush gas, and, in the next cycle, the clean gas is extracted from the combustion chamber. A thermal afterburning cycle of this kind normally lasts between 1 and 5 minutes, and ideally between 1 and 2 minutes.

The clean gas can be used as flush gas. In order to further improve the purification efficiency of the regenerative thermal afterburning system, the hot air, too, can be used as flush gas. As mentioned above, the latter is produced by heating fresh air with a burner. This hot air can also be fed into the clean gas to produce a preheated flush gas. The temperature of the clean gas should be increased by preferably between 50 and 200° C., ideally between 100 and 150° C. The increase in the temperature of the flush gas facilitates desorption of polyaromatic hydrocarbons in particular, during flushing of the heat accumulator bodies.

According to the invention, if deposits on the heat accumulator bodies occur after a longer period of operation, these are removed by pyrolysis. Moreover, according to the invention, in order to ensure that the regenerative thermal afterburning system is still able to purify waste gas and maintain its maximum purification efficiency at a constant level during pyrolysis, an additional, fourth regenerator is integrated into the regenerative thermal afterburning system. This assists the pyrolysis process, while the other three regenerators simultaneously treat the waste gas. For the pyrolysis of the deposits in the fourth regenerator, the combustion chamber air is extracted from the chamber and fed into the gas line upstream of the regenerative thermal afterburning system.

For the purposes of the pyrolysis process, the heat accumulator bodies are heated with the combustion chamber air to at least 400° C. for at least 1 hour. After pyrolysis, the regenerator is flushed with clean gas and cooled. Any surplus energy from the combustion of the contaminants can thus be used for the pyrolysis process. Once the regenerator that has been cleaned by pyrolysis has cooled down, it can be used as a clean gas regenerator, through which the clean gas from the combustion chamber can be extracted in the regenerative thermal afterburning process. The next regenerator can then be operated in pyrolysis mode.

As part of the apparatus according to the invention, a temperature sensor is envisaged to regulate the extraction shut-off device in each generator. This measures, and, if necessary, limits the temperature of the heat accumulator bodies. The temperature sensor should preferably be fitted at the lower outlet of the generator.

The principal fan to discharge the waste gas, the clean gas, and the flush gas in order to create low (negative) pressure in the regenerators should preferably be located downstream of the regenerative thermal afterburning system in the clean gas line. The flush gas line on the pressure side of the fan should preferably be connected to the clean gas line. Moreover, the extraction line should preferably be connected to the flush gas line, and the flush gas shut-off devices should preferably function as the extraction shut-off devices. Additionally, a fan and a shut-off device, preferably, are envisaged in the extraction line. The shut-off device can be fitted on the extraction side of the fan.

Of course, according to the invention, the regenerative thermal afterburning system can also have more than four regenerators. For example, there could be six regenerators, with two for the crude gas operation, two for the clean gas operation, one regenerator for the flush operation and one for the pyrolysis operation.

The embodiment of the present invention realizes, also in the case of aerosol and dust-laden waste gases, a regenerative thermal afterburning system featuring constant, highly efficient purification efficiency in all modes of operation, while simultaneously guaranteeing a high level of availability together with low maintenance costs.

The invention is described below, based on the attached drawings. These illustrate the following:

FIG. 1 the flow chart for an embodiment in accordance with the invention;

Figure 1:
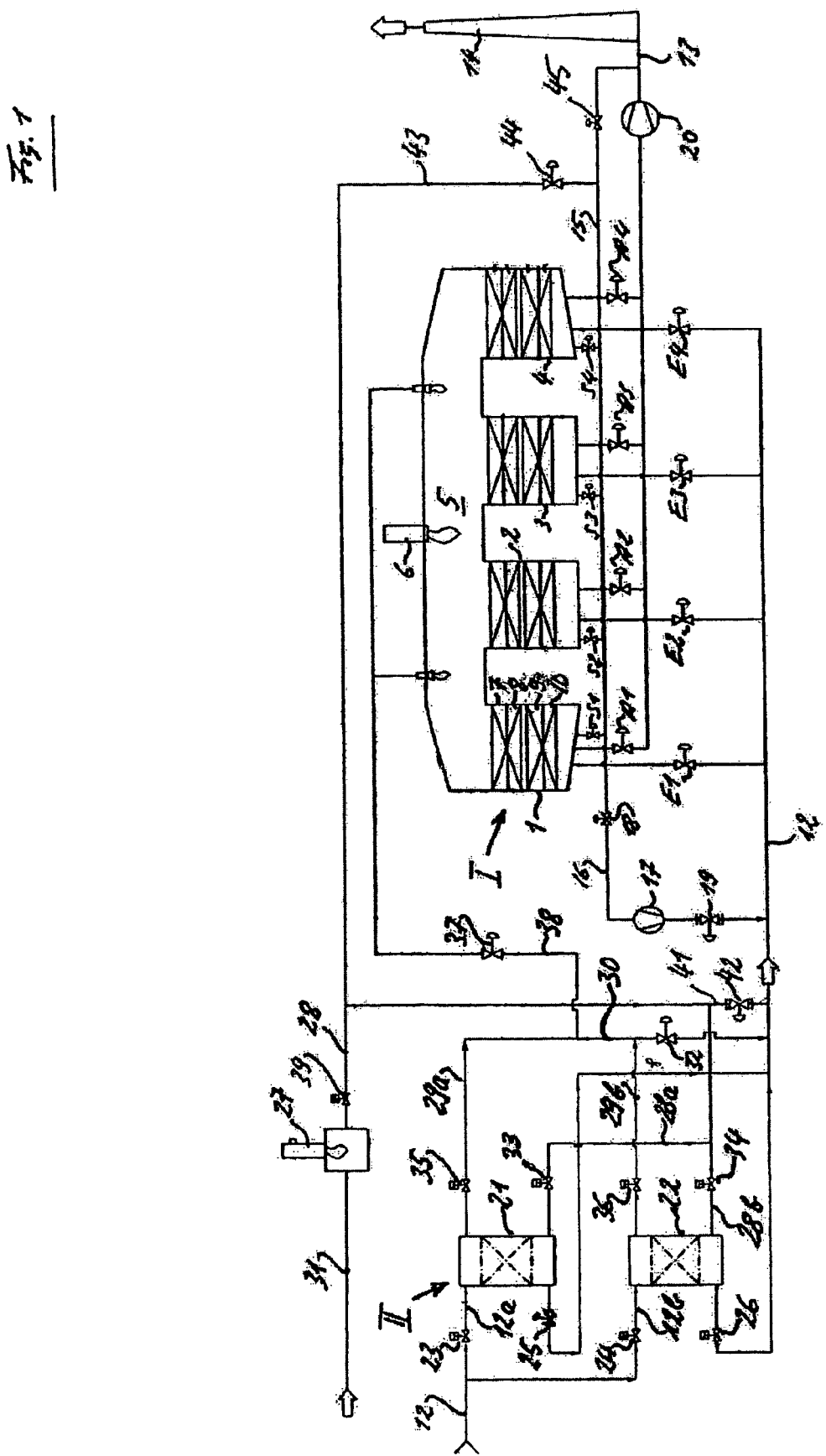

As depicted in FIG. 1, the apparatus features a regenerative thermal afterburning system I, with four regenerators 1, 2, 3 and 4, which are connected to a common combustion chamber 5, fitted with a main burner or similar heating device 6. Each regenerator 1, 2, 3, 4, is fitted with four layers 7, 8, 9, 10, consisting of several heat accumulator bodies that are rectangular in cross-section and equipped with parallel ducts, as described in EP 0 472 605 B2.

Each regenerator 1, 2, 3, 4, is connected from its lower end opposite the combustion chamber 5, via an inlet shut-off device E1, E2, E3, E4 to the crude gas line 12, through which the waste gas to be treated flows, and via an outlet shut-off device A1, A2, A3, A4 to the clean gas line 13, through which the clean gas is fed to a stack 14, for release into the atmosphere, and via a flush shut-off device S1, S2, S3, S4 to a flush line 15. The shut-off devices mentioned can be designed as flaps or valves. This also applies to all other shut-off devices in the apparatus that are mentioned below.

A distinction is made between normal operation and pyrolysis operation.

As long as no pyrolysis is being performed, the available fourth regenerator can be used each time as a second clean gas tower. This maintains the desired temperature profile in the tower, and the pressure loss in the overall system is reduced by approx. 25%.

In this "normal operating mode," the towers are relayed as follows:

The shut-off devices of three of the regenerators 1, 2, 3, 4, e.g. those in regenerators 1, 2, and 3, are regulated, for example, so that the inlet shut-off device E1 is open in regenerator 1 in the first cycle, while the outlet shut-off device A1 and the flush shut-off device S1 are closed. Meanwhile, in regenerator 2, the inlet shut-off device E2 and the flush shut-off device S2 are closed, while the outlet shut-off device A2 is open. In regenerator 3, the flush shut-off device S3 is open, while the inlet shut-off device E3 and the outlet shut-off device A3 are closed.

This means that, in this cycle, the crude gas from line 12 is fed to regenerator 1, whose heat accumulator bodies 7, 8, 9, and 10 have been heated in the previous cycle. The gas is then heated, and burned in the combustion chamber 5 by the burner 6 at a temperature of approx. 800° C. to yield clean gas. The hot clean gas is fed through regenerator 2, with simultaneous heating of the latter's heat accumulator bodies 7, 8, 9, and 10, to the clean gas line 13 at a temperature of between 40 and 80° C. At the same time, regenerator 3 is flushed with clean gas from the flush gas line 15 via the open valve 45. Additionally, the clean gas for the flush process is further heated by between 20° and 200°, preferably by between 50° and 100°, via the preheat line 43 and valve 44 using hot fresh air so that it can remove any components adsorbed on the ceramics.

In the next cycle, the inlet valve E2 in regenerator 2 is opened, and the outlet valve A2 and flush valve S2 are closed. Meanwhile, in regenerator 3, the inlet valve E3 and flush valve S3 are closed, while the outlet valve A3 is open. In regenerator 1, only the flush valve S1 is open, while the inlet valve E1 and outlet valve A1 remain closed. In the next cycle, therefore, the crude gas from crude gas line 12 is fed to regenerator 2, whose heat accumulator bodies 7, 8, 9, and 10 were heated in the previous cycle. The gas is heated there and burned in the combustion chamber 5 by the burner 6 to yield clean gas. This is then extracted through regenerator 3 into the clean gas line 13. Meanwhile, regenerator 1 is again flushed with preheated clean gas from the flush gas line 15.

In the next cycle, the crude gas from crude gas line 12 is admitted to regenerator 3, regenerator 1 is connected to clean gas line 13, and regenerator 2 is flushed with flush gas from the flush gas line, etc.

In pyrolysis mode, the valves are relayed as follows: The shut-off devices of three of the regenerators 1, 2, 3, 4, e.g. those in regenerators 1, 2, and 3, are controlled so that the inlet shut-off device E1 is open in regenerator 1 in the first cycle, while the outlet shut-off device A1 and flush shut-off device S1 are closed. Meanwhile, in regenerator 2, the inlet shut-off device E2 and flush shut-off device S2 are closed, while the outlet shut-off device A2 is open. In regenerator 3, the flush shut-off device S3 is open, while the inlet shut-off device E3 and outlet shut-off device A3 are closed.

This means that, in this cycle, the crude gas from line 12 is fed to regenerator 1, whose heat accumulator bodies 7, 8, 9, and 10 have been heated in the previous cycle. This gas is heated as it passes through the heat accumulator bodies, and burned in the combustion chamber 5 by burner 6 at a temperature of approx. 800° C. to yield clean gas. The hot clean gas is fed through regenerator 2, cooling off by heating the latter's heat accumulator bodies 7, 8, 9, and 10, and enters clean gas line 13 at a temperature of, e.g., between 40 and 80° C. At the same time, regenerator 3 is flushed from top to bottom in the direction of the extraction line with hot combustion chamber gas, while the flush air is fed to the crude gas via fan 17 and open valve 19. No provision is made for heating the flush air, since the flushing is done with hot combustion chamber air.

In the next cycle, the inlet valve E2 in regenerator 2 is opened, and the outlet valve A2 and flush valve S2 are closed. Meanwhile, in regenerator 3, the inlet valve E3 and flush valve S3 are closed, while the outlet valve A3 is open. In regenerator 1, only the flush valve S1 is open, while the inlet valve E1 and outlet valve A1 remain closed. In the next cycle, therefore, the crude gas from crude gas line 12 is fed to regenerator 2, whose heat accumulator bodies 7, 8, 9, and 10 were heated in the previous cycle. The gas is heated there and burned in the combustion chamber 5 by the burner 6 to yield clean gas. This is then extracted through regenerator 3 and fed into clean gas line 13. Meanwhile, regenerator 1 is again flushed with clean gas from combustion chamber 5 and the flush air is suctioned off into extraction line 16, and finally into the crude gas.

In the next cycle, the crude gas from crude gas line 12 is admitted to regenerator 3, regenerator 1 is connected to the clean gas line 13, and regenerator 2 is flushed with flush gas and the flush air is suctioned off into extraction line 16, etc.

While the thermal afterburning process is carried out with the regenerators 1, 2, 3, i.e. the carbon compounds in the waste gas to be purified are burned, the fourth regenerator 4 is purified by pyrolysis from deposits that have accumulated in its heat accumulation bodies over time. In the process, the hot combustion chamber air is continually extracted from combustion chamber 5 and fed into the regenerator 4 that is being treated and then, as with the flush air, admitted into the crude gas via the extraction line 16 and fan 17.

Each regenerator 1, 2, 3, 4, is therefore connectable to an extraction line 16 at the end opposite the combustion chamber 5, in order to extract combustion chamber air from the combustion chamber 5. The extraction line is equipped with a fan 17, and is connected to crude gas line 12.

Extraction line 16 is connected to the flush gas line 15 via a shut-off device 18, with an additional shut-off device 19 between fan 17 and crude gas line 12.

The waste gases created in the pyrolysis of deposits in regenerators 1, 2, 3, 4 are first extracted via the respective open flush shut-off devices S1, S2, S3, S4 into the flush gas line 15, before passing into the waste gas line 16. The inlet shut-off device E4 and outlet shut-off device A4 in the regenerator 4 to be treated are permanently closed during the pyrolysis process.

A temperature sensor, which is not depicted, is envisaged underneath the lowest layer 10 of the heat accumulator bodies in each regenerator 1, 2, 3, 4. For the pyrolysis of the deposits, the lower layers 9 and 10 are heated with the hot combustion chamber air to a temperature of at least 400° C. and maintained at this temperature for at least 1 hour, preferably for more than 3 hours. After pyrolysis, the respective regenerator 1, 2, 3, 4 is flushed and cooled with clean gas from the clean gas line 15 by opening the flap 45.

The principal fan 20 is envisaged to create low (negative) pressure in regenerators 1, 2, 3, 4 downstream of the afterburning system I in the clean gas line 13. The flush gas line 15 on the pressure side of fan 20 is connected to the clean gas line 13.

A preliminary purification system II is installed upstream of the afterburning system I in the crude gas line 12, with at least two fixed-bed filter devices 21, 22 connected in parallel, which can be alternately switched to separation or regeneration mode.

The crude gas line 12 is divided into two branch lines 12*a* and 12*b*. The waste gas is fed along the branch lines 12*a* and 12*b* to the upper end of the fixed-bed filters 21, 22 via the shut-off devices 23, 24, and drawn off at the lower end of the fixed-bed filters 21, 22, where shut-off devices 25, 26 are also envisaged. If the respective fixed-bed filter devices 21, 22 are switched to separation mode, the corresponding shut-off devices 23 or 24, respectively, and 25 or 26, respectively, in the branch lines 12*a* and 12*b* remain open. When the respective fixed-bed filter devices 21, 22 are in regeneration mode, shut-off devices 23 and 25, or 24 and 26, remain closed.

Hot air is used for the regeneration of the fixed-bed filter devices 21, 22. Fresh air that is fed in along line 31 is heated with a burner 27, and passed along the hot-air line 28 to the fixed-bed filter devices 21, 22. Hot air line 28 is divided into two branch lines 28*a* and 28*b*, each of which is connected to the lower end of one of the fixed-bed filters 21, 22. A line 29*a*, 29*b* leads from the upper end of each fixed-bed filter 21, 22 to a collecting main 30, which is connected to the crude gas line 12 between the afterburning system I and the preliminary purification system II, and is also fitted with a shut-off device 32. Shut-off devices 33, 34, 35, and 36 are also envisaged in lines 28*a*, 28*b*, 29*a*, 29*b*. A branch line 38 fitted with a shut-off device 37 leads from the collecting main 30 to the combustion chamber 5 of the regenerative thermal afterburning system I.

If, for example, the fixed-bed filter 21 is switched to regeneration mode, shut-off devices 23 and 25, along which crude gas is passed, or from which filtered crude gas is extracted, are closed, and the shut-off devices 33, 35 in branch line 28*a* and 29*a* are opened. In addition, the shut-off device 39 in hot air line 28 is opened, as is the shut-off device 32 in the collecting main 30 to the crude gas line 12, while the shut-off device 37 in the branch line 38 is temporarily closed.

In this way, the fixed-bed filter 21 is heated by the hot air passing along the hot air line 28 and the line 28*a*, whereby the more volatile compounds that are retained by the fixed-bed filter 21, or that are formed by oxidation or pyrolysis of compounds retained by fixed-bed filter 21, are fed along line 29*a* and the collecting main 30 to crude gas line 12. If the temperature in the fixed-bed filter 21 reaches, e.g., 300° C., shut-off device 32 is closed and shut-off device 37 is opened, so that the less volatile compounds that still remain in fixed-bed filter 21, and which can be expelled only at a higher temperature, are fed along line 29*a* and line 38 directly to the combustion chamber 5, where they are burned off.

If one of the fixed-bed filters 21 and 22 is not being regenerated, or shut-off device 32 is closed during the regeneration process, the waste gas in crude gas line 12 is pre-heated by the hot air produced by burner 27. For this, the hot air line 28 is connected to crude gas line 12 via a line 41 with a shut-off device 42.

In order to heat the clean gas in the flush gas line 15, flush gas line 15 is connected to hot air line 28 via a line 43 with a shut-off device 44. Additionally, a shut-off device 45 is envisaged in the flush gas line 15, upstream of line 43.

Figure 2:
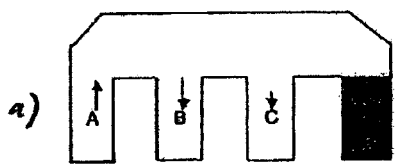
FIG. 2a is a schematic for the operation of a system with four regenerators in conjunction with Table 1.
FIG. 2b is a schematic for the operation of a system with four regenerators in conjunction with Table 1.
FIG. 2c is a schematic for the operation of a system with four regenerators in conjunction with Table 1.
FIG. 2d is a schematic for the operation of a system with four regenerators in conjunction with Table 1.
Figure 2:
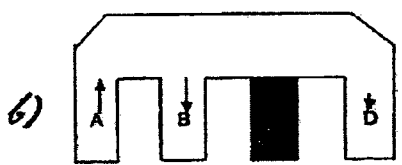
Figure 2:
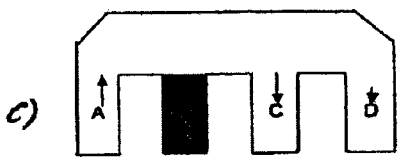
Figure 2:
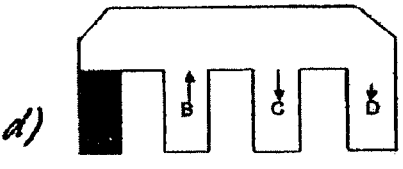

The following Table 1 shows the operating system for a regenerative thermal afterburning system with integrated pyrolysis with four regenerators or towers A, B, C, D, as illustrated in FIG. 2. The individual stages, a), b), c), and d), are shown in FIG. 2 and Table 1. The tower or regenerator that is undergoing pyrolysis in the respective stage is shown in black in FIG. 2. "Normal" in Table 1 refers to the normal operating modes for a thermal regenerative afterburning system, i.e. admission of crude gas, extraction of clean gas, and also flushing.

Figure 3:
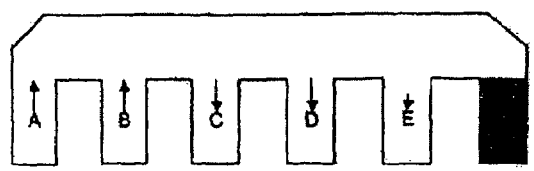
FIG. 3a is a schematic for the operation of a system with six regenerators in conjunction with Table 2.
FIG. 3b is a schematic for the operation of a system with six regenerators in conjunction with Table 2.
FIG. 3c is a schematic for the operation of a system with six regenerators in conjunction with Table 2.
FIG. 3d is a schematic for the operation of a system with six regenerators in conjunction with Table 2.
FIG. 3e is a schematic for the operation of a system with six regenerators in conjunction with Table 2.
FIG. 3f is a schematic for the operation of a system with six regenerators in conjunction with Table 2.
Figure 3:
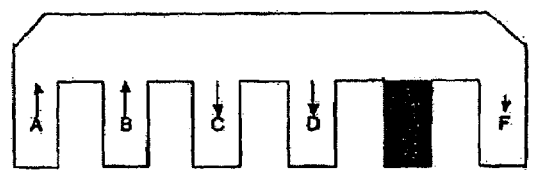
Figure 3:
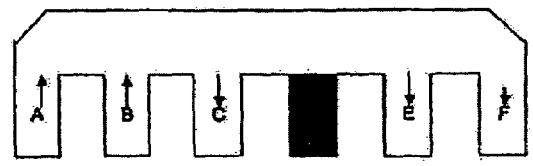
Figure 3:
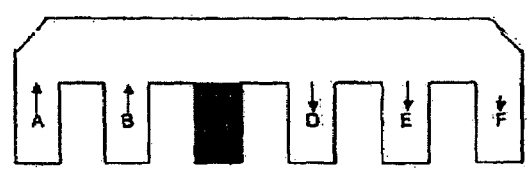
Figure 3:
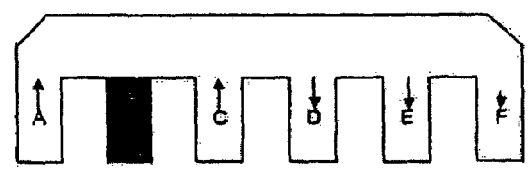
Figure 3:
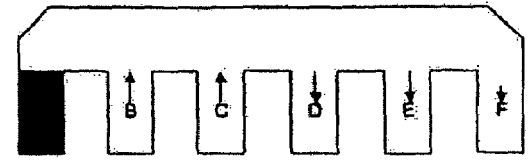

Table 2 and FIG. 3 show the operating system for a similar system with six regenerators or towers A, B, C, D, E, F, with the stages a), b), c), d), e), and f).

TABLE 1

A

| Zyklus | Betriebsart | Zeit (min) | Turn A | Turn B | Turn C | Turn D |
|---|---|---|---|---|---|---|
| 1 | normal | 1 | Rohgas | Reingas | Reingas | Spülen |
| 2 | normal | 1 | Spülen | Rohgas | Reingas | Reingas |
| 3 | normal | 1 | Reingas | Spülen | Rohgas | Reingas |
| 4 | normal | 2 | Reingas | Reingas | Spülen | Rohgas |
| 1 | Pyrolyse D | 2 | Rohgas | Reingas | Spülen | Pyrolyse |
| 2 | Pyrolyse D | 2 | Spülen | Rohgas | Reingas | Pyrolyse |
| 3 | Pyrolyse D | 2 | Reingas | Spülen | Rohgas | Pyrolyse |

B

| Zyklus | Betriebsart | Zeit (min) | Turn A | Turn B | Turn C | Turn D |
|---|---|---|---|---|---|---|
| 1 | normal | 1 | Rohgas | Reingas | Reingas | Spülen |
| 2 | normal | 1 | Spülen | Rohgas | Reingas | Reingas |
| 3 | normal | 1 | Reingas | Spülen | Rohgas | Reingas |
| 4 | normal | 2 | Reingas | Reingas | Spülen | Rohgas |
| 1 | Pyrolyse C | 2 | Rohgas | Reingas | Pyrolyse | Spülen |
| 2 | Pyrolyse C | 2 | Spülen | Rohgas | Pyrolyse | Reingas |
| 3 | Pyrolyse C | 2 | Reingas | Spülen | Pyrolyse | Rohgas |

C

| Zyklus | Betriebsart | Zeit (min) | Turn A | Turn B | Turn C | Turn D |
|---|---|---|---|---|---|---|
| 1 | normal | 1 | Rohgas | Reingas | Reingas | Spülen |
| 2 | normal | 1 | Spülen | Rohgas | Reingas | Reingas |
| 3 | normal | 1 | Reingas | Spülen | Rohgas | Reingas |
| 4 | normal | 2 | Reingas | Reingas | Spülen | Rohgas |
| 1 | Pyrolyse B | 2 | Rohgas | Pyrolyse | Reingas | Spülen |
| 2 | Pyrolyse B | 2 | Spülen | Pyrolyse | Rohgas | Reingas |
| 3 | Pyrolyse B | 2 | Reingas | Pyrolyse | Spülen | Rohgas |

D

| Zyklus | Betriebsart | Zeit (min) | Turn A | Turn B | Turn C | Turn D |
|---|---|---|---|---|---|---|
| 1 | normal | 1 | Rohgas | Reingas | Reingas | Spülen |
| 2 | normal | 1 | Spülen | Rohgas | Reingas | Reingas |
| 3 | normal | 1 | Reingas | Spülen | Rohgas | Reingas |
| 4 | normal | 2 | Reingas | Reingas | Spülen | Rohgas |
| 1 | Pyrolyse A | 2 | Pyrolyse | Rohgas | Reingas | Spülen |
| 2 | Pyrolyse A | 2 | Pyrolyse | Spülen | Rohgas | Reingas |
| 3 | Pyrolyse A | 2 | Pyrolyse | Reingas | Spülen | Rohgas |

TABLE 2

A

| Zyklus | Betriebsart | Zeit (min) | Turn A | Turn B | Turn C | Turn D | Turn E | Turn F |
|---|---|---|---|---|---|---|---|---|
| 1 | normal | 1 | Rohgas | Rohgas | Reingas | Reingas | Reingas | Spülen |
| 2 | normal | 1 | Spülen | Rohgas | Rohgas | Reingas | Reingas | Reingas |
| 3 | normal | 1 | Reingas | Spülen | Rohgas | Rohgas | Reingas | Reingas |
| 4 | normal | 1 | Reingas | Reingas | Spülen | Rohgas | Rohgas | Reingas |
| 5 | normal | 1 | Reingas | Reingas | Reingas | Spülen | Rohgas | Rohgas |
| 6 | normal | 1 | Rohgas | Reingas | Reingas | Reingas | Spülen | Rohgas |
| 1 | Pyrolyse F | 1 | Rohgas | Rohgas | Reingas | Reingas | Spülen | Pyrolyse |
| 2 | Pyrolyse F | 1 | Spülen | Rohgas | Rohgas | Reingas | Reinges | Pyrolyse |
| 3 | Pyrolyse F | 1 | Reingas | Spülen | Rohgas | Rohgas | Reingas | Pyrolyse |
| 4 | Pyrolyse F | 1 | Reingas | Reingas | Spülen | Rohgas | Rohgas | Pyrolyse |
| 5 | Pyrolyse F | 1 | Rohgas | Reingas | Rohgas | Spülen | Rohgas | Pyrolyse |

B

| Zyklus | Betriebsart | Zeit (min) | Turn A | Turn B | Turn C | Turn D | Turn E | Turn F |
|---|---|---|---|---|---|---|---|---|
| 1 | normal | 1 | Rohgas | Rohgas | Reingas | Reingas | Reingas | Spülen |
| 2 | normal | 1 | Spülen | Rohgas | Rohgas | Reingas | Reingas | Reingas |
| 3 | normal | 1 | Reingas | Spülen | Rohgas | Rohgas | Reingas | Reingas |
| 4 | normal | 1 | Reingas | Reingas | Spülen | Rohgas | Rohgas | Reingas |
| 5 | normal | 1 | Reingas | Reingas | Reingas | Spülen | Rohgas | Rohgas |
| 6 | normal | 1 | Rohgas | Reingas | Reingas | Reingas | Spülen | Rohgas |
| 1 | Pyrolyse E | 1 | Rohgas | Rohgas | Reingas | Reingas | Pyrolyse | Spülen |
| 2 | Pyrolyse E | 1 | Spülen | Rohgas | Rohgas | Reingas | Pyrolyse | Reingas |
| 3 | Pyrolyse E | 1 | Reingas | Spülen | Rohgas | Rohgas | Pyrolyse | Reingas |
| 4 | Pyrolyse E | 1 | Reingas | Reingas | Spülen | Rohgas | Pyrolyse | Rohgas |
| 5 | Pyrolyse E | 1 | Rohgas | Reingas | Reingas | Spülen | Pyrolyse | Rohgas |

C

| Zyklus | Betriebsart | Zeit (min) | Turn A | Turn B | Turn C | Turn D | Turn E | Turn F |
|---|---|---|---|---|---|---|---|---|
| 1 | normal | 1 | Rohgas | Rohgas | Reingas | Reingas | Reingas | Spülen |
| 2 | normal | 1 | Spülen | Rohgas | Rohgas | Reingas | Reingas | Reingas |
| 3 | normal | 1 | Reingas | Spülen | Rohgas | Rohgas | Reingas | Reingas |
| 4 | normal | 1 | Reingas | Reingas | Spülen | Rohgas | Rohgas | Reingas |
| 5 | normal | 1 | Reingas | Reingas | Reingas | Spülen | Rohgas | Rohgas |
| 6 | normal | 1 | Rohgas | Reingas | Reingas | Reingas | Spülen | Rohgas |
| 1 | Pyrolyse D | 1 | Rohgas | Rohgas | Reingas | Pyrolyse | Reingas | Spülen |
| 2 | Pyrolyse D | 1 | Spülen | Rohgas | Rohgas | Pyrolyse | Reinges | Reinges |
| 3 | Pyrolyse D | 1 | Reingas | Spülen | Rohgas | Pyrolyse | Rohgas | Reingas |
| 4 | Pyrolyse D | 1 | Reingas | Reingas | Spülen | Pyrolyse | Rohgas | Rohgas |
| 5 | Pyrolyse D | 1 | Rohgas | Reingas | Rohgas | Pyrolyse | Spülen | Rohgas |

TABLE 2-continued

D

| Zyklus | Betriebsart | Zeit (min) | Turm A | Turm B | Turm C | Turm D | Turm E | Turm F |
|---|---|---|---|---|---|---|---|---|
| 1 | normal | 1 | Rohgas | Rohgas | Reingas | Reingas | Reingas | Spülen |
| 2 | normal | 1 | Spülen | Rohgas | Rohgas | Reingas | Reingas | Reingas |
| 3 | normal | 1 | Reingas | Spülen | Rohgas | Rohgas | Reingas | Reingas |
| 4 | normal | 1 | Reingas | Reingas | Spülen | Rohgas | Rohgas | Reingas |
| 5 | normal | 1 | Reingas | Reingas | Reingas | Spülen | Rohgas | Rohgas |
| 6 | normal | 1 | Rohgas | Reingas | Reingas | Reingas | Spülen | Rohgas |
| 1 | Pyrolyse C | 1 | Rohgas | Rohgas | Pyrolyse | Reingas | Reingas | Spülen |
| 2 | Pyrolyse C | 1 | Spülen | Rohgas | Pyrolyse | Rohgas | Reinges | Reinges |
| 3 | Pyrolyse C | 1 | Reingas | Spülen | Pyrolyse | Rohgas | Rohgas | Reingas |
| 4 | Pyrolyse C | 1 | Reingas | Reingas | Pyrolyse | Spülen | Rohgas | Rohgas |
| 5 | Pyrolyse C | 1 | Rohgas | Reingas | Pyrolyse | Reingas | Spülen | Rohgas |

E

| Zyklus | Betriebsart | Zeit (min) | Turm A | Turm B | Turm C | Turm D | Turm E | Turm F |
|---|---|---|---|---|---|---|---|---|
| 1 | normal | 1 | Rohgas | Rohgas | Reingas | Reingas | Reingas | Spülen |
| 2 | normal | 1 | Spülen | Rohgas | Rohgas | Reingas | Reingas | Reingas |
| 3 | normal | 1 | Reingas | Spülen | Rohgas | Rohgas | Reingas | Reingas |
| 4 | normal | 1 | Reingas | Reingas | Spülen | Rohgas | Rohgas | Reingas |
| 5 | normal | 1 | Reingas | Reingas | Reingas | Spülen | Rohgas | Rohgas |
| 6 | normal | 1 | Rohgas | Reingas | Reingas | Reingas | Spülen | Rohgas |
| 1 | Pyrolyse B | 1 | Rohgas | Pyrolyse | Rohgas | Reingas | Reingas | Spülen |
| 2 | Pyrolyse B | 1 | Spülen | Pyrolyse | Rohgas | Rohgas | Reinges | Reinges |
| 3 | Pyrolyse B | 1 | Reingas | Pyrolyse | Spülen | Rohgas | Rohgas | Reingas |
| 4 | Pyrolyse B | 1 | Reingas | Pyrolyse | Reingas | Spülen | Rohgas | Rohgas |
| 5 | Pyrolyse B | 1 | Rohgas | Pyrolyse | Reingas | Reingas | Spülen | Rohgas |

F

| Zyklus | Betriebsart | Zeit (min) | Turm A | Turm B | Turm C | Turm D | Turm E | Turm F |
|---|---|---|---|---|---|---|---|---|
| 1 | normal | 1 | Rohgas | Rohgas | Reingas | Reingas | Reingas | Spülen |
| 2 | normal | 1 | Spülen | Rohgas | Rohgas | Reingas | Reingas | Reingas |
| 3 | normal | 1 | Reingas | Spülen | Rohgas | Rohgas | Reingas | Reingas |
| 4 | normal | 1 | Reingas | Reingas | Spülen | Rohgas | Rohgas | Reingas |
| 5 | normal | 1 | Reingas | Reingas | Reingas | Spülen | Rohgas | Rohgas |
| 6 | normal | 1 | Rohgas | Reingas | Reingas | Reingas | Spülen | Rohgas |
| 1 | Pyrolyse A | 1 | Pyrolyse | Rohgas | Rohgas | Reingas | Reingas | Spülen |
| 2 | Pyrolyse A | 1 | Pyrolyse | Spülen | Rohgas | Rohgas | Reinges | Reinges |
| 3 | Pyrolyse A | 1 | Pyrolyse | Reingas | Spülen | Rohgas | Rohgas | Reingas |
| 4 | Pyrolyse A | 1 | Pyrolyse | Reingas | Reingas | Spülen | Rohgas | Rohgas |
| 5 | Pyrolyse A | 1 | Pyrolyse | Rohgas | Reingas | Reingas | Spülen | Rohgas |

[Translation of Text in Tables 1 and 2:]

[Headings]
 Zyklus→Cycle
 Betriebsart→Operating mode
 Zeit (min)→Time (min)
 Turm→Tower

[Contents]
 normal→Normal
 Pyrolyse→Pyrolysis
 Rohgas→Crude gas
 Reingas→Clean gas
 Spülen→Flushing

The invention claimed is:

1. A method for treating waste gas with at least one regenerative thermal afterburning system, comprising at least four regenerators filled with ceramic heat accumulator bodies and connected to a common combustion chamber, the waste gas being admitted in a first phase, at least to a first said regenerator, whose heat accumulator bodies have been preheated, in order to burn the waste gas in the combustion chamber to yield clean gas, the clean gas being extracted by at least a second said regenerator, with simultaneous heating of the said heat accumulator bodies of said second regenerator, and with at least a third said regenerator that is flushed with said clean gas that is extracted from the combustion chamber as extracted flush air, the extracted flush air then being admitted to the waste gas, and in a second phase, the waste gas being admitted to the second regenerator, whose heat accumulator bodies were heated during the first phase, in order to burn the waste gas in the combustion chamber to yield clean gas, the clean gas then being extracted through the third regenerator with simultaneous heating of the heat accumulator bodies of the third regenerator, the first regenerator being flushed with said clean gas that has been extracted from the combustion chamber as extracted flush air, and the extracted flush air being admitted to the waste gas, with the waste gas, in a third phase, being admitted to the third regenerator, whose heat accumulator bodies were heated in the second phase, in order to burn the waste gas in the combustion chamber to yield clean gas, the clean gas being extracted by the first regenerator with simultaneous heating of the accumulator bodies of the first regenerator, the second regenerator being flushed with said clean gas that has been extracted from the combustion chamber as extracted flush air, the extracted flush air being admitted to the waste gas, with the first, second, and third phases being repeated continuously, and at least one remaining fourth said regenerator extracting the clean gas from the combustion chamber, said clean gas then being admitted to the waste gas via a fan in order to remove deposits from the heat accumulator bodies of the fourth regenerator by means of pyrolysis in a pyrolysis process, and the clean gas then being burned again in the combustion chamber together with the waste gas.

2. The method according to claim 1, characterized in that the heat accumulator bodies are heated by the heated combustion chamber air for at least 1 hr to at least 400° C. for the pyrolysis process.

3. The method according to claim 1, characterized in that the regenerator is flushed with clean gas and cooled after pyrolysis.

4. The method according to claim 1, characterized in that the waste gas, before being admitted to the regenerative thermal afterburning system, is admitted to a preliminary purification system with at least two fixed-bed filter devices connected in parallel, which can be alternately switched to separation mode or regeneration mode, respectively.

5. The method according to claim 4, characterized in that regeneration of the fixed-bed filter devices is performed by heating.

6. The method according to claim 5, characterized in that regeneration of the fixed-bed filter devices is performed with heated air.

7. The method according to claim 6, characterized in that the heated air is generated by heating fresh air with a burner.

8. The method according to claim 7, characterized in that the temperature of the waste gases in the crude gas line to the regenerative thermal afterburning system is increased by the heated air by between 20 and 100° C.

9. The method according to claim 8, wherein the temperature of the waste gases is increased by between 30 and 50° C.

10. The method according to claim 7, characterized in that the temperature of the clean gas to flush the regenerators is increased in normal operating mode by the heated air by between 50 and 200° C.

11. The method according to claim 10, wherein the temperature of the clean gas is increased in the normal operating mode by between 100 and 150° C.

12. The method according to claim 6, characterized in that waste gases created by heating the fixed-bed filter devices are first admitted to the waste gas in a crude gas line leading to the regenerative thermal afterburning system and then, at a temperature of over 200° C., to the combustion chamber of the regenerative thermal afterburning system.

13. The method according to claim 12, wherein the temperature of the waste gases is over 300° C.

14. The method according to claim 1, characterized in that a further regenerator is incorporated in normal operating mode so that two of the regenerators can be used simultaneously as clean gas towers, with one said regenerator being flushed and one said regenerator being used as a crude gas tower.

* * * * *